United States Patent
Jutras (10) Patent No.: US 10,274,980 B2
(45) Date of Patent: Apr. 30, 2019

(54) CONFIGURABLE LED POWER SUPPLY WITH WIRELESS INTERFACE

(71) Applicant: BEL FUSE (MACAO COMMERCIAL OFFSHORE) LIMITED, Andar H-K (MO)

(72) Inventor: Mark Jutras, Upton, MA (US)

(73) Assignee: Bel Fuse (Macao Commercial Offshore) Limited, Andar H-K (MO)

( * ) Notice: Subject to any disclaimer, the term of this patent is extended or adjusted under 35 U.S.C. 154(b) by 362 days.

(21) Appl. No.: 14/873,749

(22) Filed: Oct. 2, 2015

(65) Prior Publication Data

US 2016/0098046 A1   Apr. 7, 2016

Related U.S. Application Data

(60) Provisional application No. 62/059,207, filed on Oct. 3, 2014.

(51) Int. Cl.
| | |
|---|---|
| *G05F 1/46* | (2006.01) |
| *F21V 23/04* | (2006.01) |
| *H05B 33/08* | (2006.01) |
| *H05B 37/02* | (2006.01) |
| *H02J 7/04* | (2006.01) |
| *H02J 7/00* | (2006.01) |

(52) U.S. Cl.
CPC ............ *G05F 1/46* (2013.01); *F21V 23/0435* (2013.01); *H02J 7/04* (2013.01); *H05B 33/0851* (2013.01); *H05B 37/0272* (2013.01); *H02J 7/0004* (2013.01); *Y02B 20/48* (2013.01)

(58) Field of Classification Search
CPC ........................................................ G05F 1/46
USPC ......................................................... 320/107
See application file for complete search history.

(56) References Cited

U.S. PATENT DOCUMENTS

| | | | | |
|---|---|---|---|---|
| 6,089,453 | A * | 7/2000 | Kayser ................... | G06K 17/00 235/378 |
| 8,232,745 | B2 * | 7/2012 | Chemel .................. | F21S 9/024 315/291 |
| 8,519,566 | B2 * | 8/2013 | Recker ................... | H02J 9/065 307/64 |
| 8,742,686 | B2 * | 6/2014 | Zampini, II ....... | H05B 33/0857 257/13 |
| 8,912,730 | B2 * | 12/2014 | Nakajo .................. | H05B 37/02 315/149 |

(Continued)

*Primary Examiner* — Drew A Dunn
*Assistant Examiner* — Jerry D Robbins
(74) *Attorney, Agent, or Firm* — BainwoodHuang (57) ABSTRACT

A power supply includes power circuitry configured to provide DC power to a separate load, and wireless communication circuitry for wirelessly communicating with an external control device such as a smart phone. A controller is configured to (1) conduct communications with the external control device via the wireless communication circuitry to receive configuration parameters, and (2) incorporate the configuration parameters into a control scheme for operation of the power supply. The power supply may be used with an LED lamp including a series of LEDs, and the configuration parameters establish desired operating characteristics including selection of constant-current or constant-voltage operation, and/or parameters for a dimming curve applied in dimming operation of the LED lamp. The power supply may be used in other applications including battery charging applications.

22 Claims, 6 Drawing Sheets

(56) References Cited

U.S. PATENT DOCUMENTS

| | | | |
|---|---|---|---|
| 8,994,276 B2 * | 3/2015 | Recker | H02J 9/02 |
| | | | 315/160 |
| 9,008,597 B2 * | 4/2015 | Levesque | H03F 3/193 |
| | | | 323/286 |
| 9,124,101 B2 * | 9/2015 | Jutras | H02M 3/335 |
| 9,532,438 B2 * | 12/2016 | Leung | H05B 37/0272 |
| 9,661,697 B2 * | 5/2017 | Sadwick | H05B 33/0815 |

* cited by examiner

CONFIGURABLE LED POWER SUPPLY WITH WIRELESS INTERFACE

SUMMARY

A power supply used to power a lighting device made up of a series of LED's is typically connected across an AC mains as a method of receiving input power and produces a constant output current that results in the desired LED light output without exceeding the operating limits of the LED devices. In some applications an LED string is provided a constant current that is created by a DC to DC converter. The DC to DC converter gets its input power from the output an AC to DC power supply that produces a constant output voltage.

If the power supply that is connected to the mains is used to power LED lights by either of the two described methods often times the output power, output voltage and mechanical packaging are similar or identical. However, there are enough differences in the requirements that multiple distinct product configurations, referred to herein as "SKUs" for "stock keepers units", to fit the wide variety of lamp configurations. However, while the electrical parameters vary, there is generally greater commonality for the mechanical configurations.

Many power supply topologies that employ some level of digital control can be configured electrically to operate under a multitude of different parameters. The number of SKUs required for these LED lighting applications could be reduced significantly by enabling a packaged unit to be custom configured for a given application. For example, custom configuration could be performed during installation, enabling an installer to carry a reduced number of SKUs to satisfy a number of distinct installation requirements. Alternatively it may be done at a point of distribution, enabling a distributor to carry a small number of SKUs yet to fill orders for a larger variety of applications. Custom configuration could also be performed at the factory, providing similar efficiency and customization benefits.

Knowing that hand held devices like smart phones are readily available, having a configuration interface that can be accessed by a smart phone or other external control device can greatly simplify the task of configuring such a power supply, providing installers or others an accessible method to complete that task. Power supplies are often sealed units, and most historic building wiring does not allow for additional connections required if one wanted to facilitate optimum control over the LED lamp for the purposes of dimming. Thus, incorporation of a wireless communication interface in particular provides for such external configuration without imposing requirements for physical communications connections.

A power supply is disclosed that includes power circuitry configured and operative to provide DC power to a separate load, and wireless communication circuitry operative to wirelessly communicate with an external control device. A controller is configured and operative to (1) conduct communications with the external control device via the wireless communication circuitry to receive configuration parameters, and (2) incorporate the configuration parameters into a control scheme for operation of the power supply. The power supply may be used with an LED lamp including a series of LEDs, and the configuration parameters establish desired operating characteristics including selection of constant-current or constant-voltage operation, and/or parameters for a dimming curve applied in dimming operation of the LED lamp. The power supply may be used in other applications including battery charging applications.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

The entire disclosure of U.S. Pat. No. 9,124,101 entitled Power Supply Having Selectable Operation Based on Communications With Load is incorporated by reference herein.

Overview

The following describes features of presently disclosed power supplies and LED lighting systems in which the supplies are used.

1. An LED power supply connects to an AC mains or a DC input source and is capable of providing a constant regulated current supply to a series connected string of LED's. The operational modes and output regulation of the LED power supply are controlled either by full digital control or partial digital control, and a digital control portion is capable of setting operating parameters such as regulations limits and fault protections (referred to as "configuration" herein). Fault protections can include over temperature and other stress conditions such as excessive voltage or current. In event of such fault conditions the control method will either turn off the power supply or limit operating values to prevent permanent damage or hazards operating conditions. The LED power supply may also have a means of dimming the attached LEDs by controlling the magnitude of the constant current level delivered to them or by limiting the average current delivered to them by providing the current in a continuous series of pulse were the duty cycle can be controlled to achieve the desired light output. The LED power supply may also have the ability to control its output voltage to a constant value by means of the control circuitry, and the control circuitry may be capable of setting the value of that regulated voltage. If the power supply has circuitry for regulating its output voltage in addition to its output current, a desired mode of operation (voltage regulation versus current regulation) can be configured by communications from an external device to the digital control circuitry. The power supply has communication circuitry for engaging in such communication. Configuration values delivered to the power supply by the communication circuitry can either be treated as temporary, in which case they may be stored in volatile memory, or as values for a semi-permanent or permanent operating mode, in which case the values are stored in nonvolatile memory.

2. The power supply can be constructed such that communication interface provided by the communication circuitry is a wireless interface, using a wireless protocol that may be proprietary or standard, such as Bluetooth, Zigbee, Z-Wave, WiFi, etc. The wireless communication capability includes an internal data radio that contains all of the required electronics and software to implement the wireless interface protocol. The data radio is configured to exchange data for configuring operation as well as for transmitting operating data such a voltage, current and temperature.

3. The power supply may also implement a wired communication interface using a standard serial communication protocol.

4. A power supply implementing a wired interface may contain a protection or disconnect switch in series with the power supply output that can be turned off to disconnect the output-stage power conversion circuitry from the external load. In this case the wired communication interface as described in bullet 3 may employ pulsed signaling at the output connections, with the protection switch being used to deliver a series of pulses across the output connections to transmit information to an external device. An external device may apply pulses to the output connections to convey configuration or other information to the power supply, and the pulses are interpreted by internal control circuitry to set operating conditions that are stored in memory prior to beginning normal operation with the protection switch closed.

5. In a power supply with wireless interface per bullet 2, the wireless communication circuitry (radio) may be susceptible to electrical or electromagnetic noise generated by the power supply while operating. In this case the power supply may engage in communications when not operating. For such communications, the power supply may provide a capacitor or similar energy-storing device. Once energy is stored in the storage device the power supply may then turn itself off for a finite time period during which the stored energy supplies power to the wireless communication circuitry. Wireless communication is thus established during the period of time that the power supply is off using that stored energy as a "quiet" (low noise) source of power. This period may be called a hold-up period, and the energy storage circuitry may be called hold-up circuitry. The energy storage element in this scenario is preferably sized to hold sufficient energy so that it can power the communication circuitry for a period long enough to complete the transfer of useful information. The transferred information can be stored in either volatile or nonvolatile memory and is used to set the operating conditions of the power supply once normal operation is established.

6. A power supply as described in bullet 1 that is capable of being configured as a either a constant current or constant voltage power supply may contain a switch in series with the output so that the output can remain disengaged from an attached load until the mode of operation is properly configured. In absence of such a switch the power supply may a establish a minimal-value initial output voltage prior to configuration, the initial voltage preferably low enough to avoid possible damage to an attached load but high enough to provide power to internal circuitry used for the purpose of configuration.

7. A non-configured power supply can also establish its initial operation in either burst or hiccup mode. In either mode the average output power delivered will be minimal. However, a properly sized internal energy storage element will be charged to provide sufficient energy to supply power to an internal data radio or wired communication circuit for a period long enough to gather the desired configuration data for a compatible external configuration device.

8. A system employing the power supply of bullet 2 can also include an external device for sending configuration and operating information to the power supply. The external device may be a standalone device designed specifically for such use, and it may reside (permanently or temporarily) within a proximity to the power supply that is within the range of wireless communication. The external device may be a portable device, and it may be a more general-purpose device adapted for use as the external device. An example of such device is a smart phone. For the purpose of initial configuration a smart phone can contain an application that uses the camera on the smart phone to interpret a bar code on the power supply and by means of a resident application provide an installer with an appropriate set of configuration parameters for the power supply SKU (Stock Keeper Unit) associated with the bar code information. Such functionality enables an installer of the LED power supply to carry fewer distinct SKUs for a broad set of possible applications, because the power supplies are easily configured at the point of installation for the end application. Smart phones implement wireless communications such as Bluetooth and WiFi which may be used in communicating with a compatible data radio within the LED power supply.

9. When information specific to a power supply to be configured is conveyed to a configuration application through a bar code, the bar code can contain information specific to the model number of the power supply to be configured as well as information specific to the particular power supply unit (e.g., based on serial number). Information specific to a particular unit could include data about the type of wireless interface as well as specific communication parameters such as address, timing and/or hold up time information. Any data that an application needs specifically to establish communication can be provided in one or multiple bar code labels.

10. A lamp assembly that is to be powered by a power supply may also contain a bar code that has information specific to the LEDs therein. LED lamp information associated with the bar code can be used by the configuration application configure operating parameters for the power supply that are specific to the lamp assembly and its desired operation. This can be done at the time of installation.

11. For the technique of bullet 10, the bar code-associated information about the lamp assembly might include data identifying a specific set diming curves used to dim the lamp to optimum intensity levels or light characteristics. This information is used to set specific current levels, duty cycles and/or clocking frequencies of the power supply to realize the specific dimming curves. The bar code data allows the installer to personalize the power supply to the lamp via configuration.

12. The power supply described in bullet 1 may also be resettable back to factory-shipped operating conditions so that it can be reconfigured or re-deployed in subsequent installations or applications.

13. Any firmware resident in the power supply can be boot loaded by use of the wireless or wired communications interface to the most recent factory settings or to any revision of the firmware.

14. As part of configuration, bounds of operation relative to load requirements can also be established. Limits of operation of the power supply unit in the absence of configuration can be installed prior to shipment. Using these two sets of data it is possible to move operating parameters of the power supply in such a way to satisfy limitations of the load without exceeding limitations of the power supply itself. This data can be used by optimization algorithms within the power supply to optimize efficiency, reducing power dissipation in the LED power supply. Parameters within the power supply that may be optimized included output voltage set point, operating frequency of the power supply, switching frequency of a series connecting device used as a switch for PWM dimming and other timing parameters that may result in efficiency improvements.

Although the above focuses on use of the disclosed power supply in an LED lighting system, it may have other uses. In particular, the power supply may be used in a battery charging application such as described in the above-referenced U.S. Pat. No. 9,124,101. Specifically, the wireless communications and configuration described herein may be incorporated into a power supply used in a battery charging application such as described therein.

DESCRIPTION OF EMBODIMENTS

Figure 1:
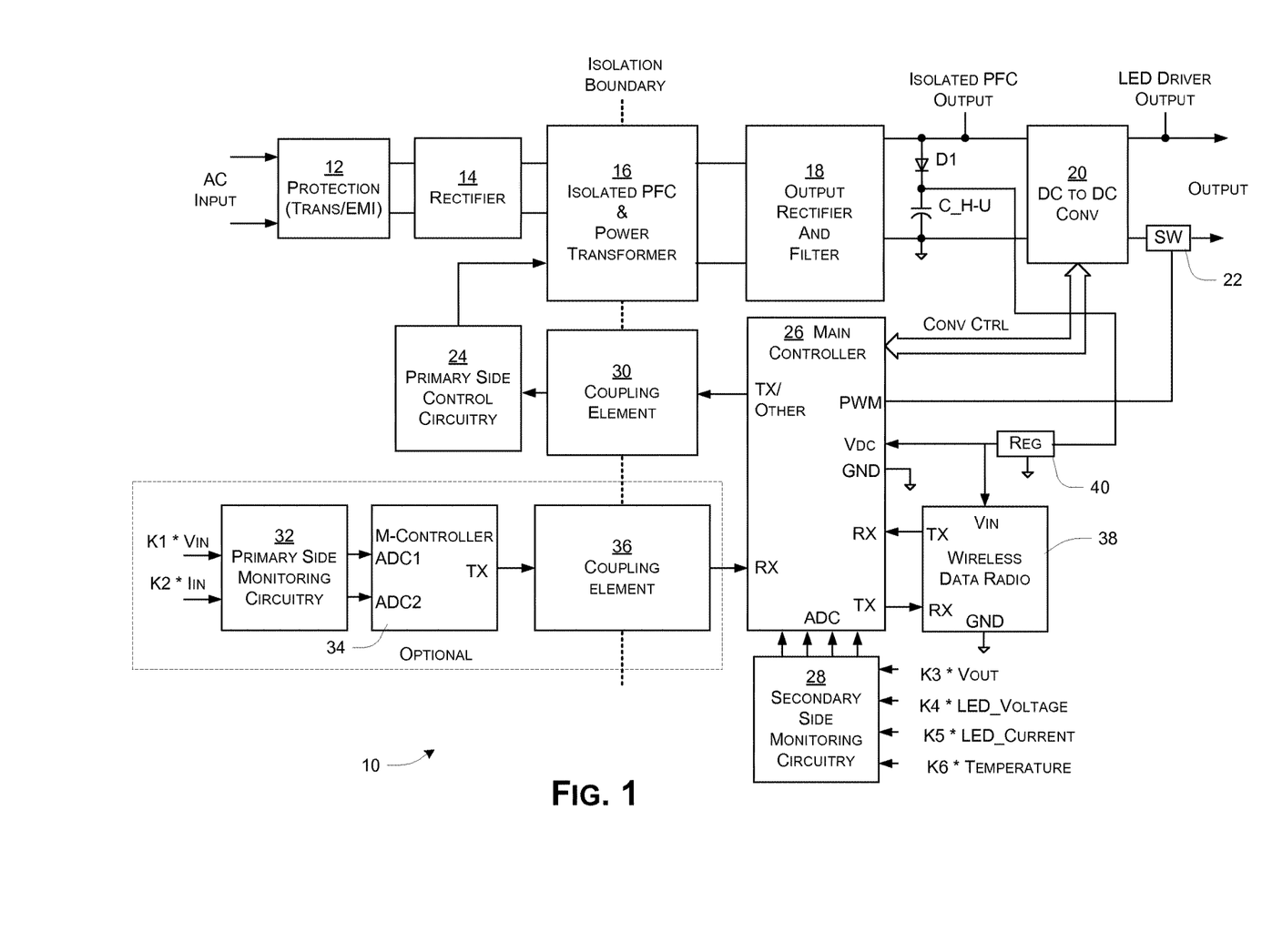
FIG. 1 is a schematic diagram of an LED power supply.

FIG. 1 is a schematic diagram of an LED power supply 10 usable to power a lamp employing light-emitting diodes (LEDs) as light-producing elements. Examples are given below. The power supply 10 has a variety of power components including protection circuitry 12, input-side rectifier 14, power factor correction (PFC) and power transformer 16, output rectifier and filter 18, DC to DC converter 20, and protection switch (SW) 22. A hold-up circuit includes a diode D1 and hold-up capacitor C_H-U. Primary and secondary sides are DC-isolated from each other, which is indicated as an isolation boundary extending through the PFC and power transformer 16. Control components include primary-side control circuitry 24, a main controller 26, and secondary-side monitoring circuitry 28. A coupling element 30 couples control signals from the main controller 26 across the isolation boundary to the primary-side control circuitry 24. The power supply 10 optionally includes primary-side monitoring circuitry 32, a microcontroller (M-controller) 34, and a second coupling element 36 for coupling signals across the isolation boundary to the main controller 26. Finally, the power supply includes a wireless data radio 38 as well as a regulator (REG) 40 providing power thereto, itself powered by the hold-up circuitry of diode D1 and hold-up capacitor C_H-U.

At a high level, the power supply 10 operates as generally known in the art. The main controller 26 implements a control scheme causing the DC-to-DC converter 20 and PFC circuitry of block 16 to operate so as to realize a desired mode of operation. Control variables include one or more of output voltage Vout, LED voltage, LED current, and temperature. Signals representing these values are provided via the secondary-side monitoring circuitry 28 to the main controller 26 for use in the control scheme. As shown below, two major operating modes are constant-current and constant-voltage. For constant-current operation, the main controller 26 controls the DC to DC converter 20 and PFC circuitry of block 16 to maintain a desired constant output current. For constant-voltage operation, the main controller 26 controls the DC to DC converter 20 and PFC circuitry of block 16 to maintain a desired constant output voltage. The modes may be not exclusive. For example, the main controller 26 might implement constant-current control as long as the output voltage is within a particular desired window of values, and implement constant-voltage control when the output voltage is outside of that window. Other mixed or alternating modes of operation may be used.

The wireless data radio 38 is structured and used for configuration purposes in the manner described in the Overview above. It receives wireless communication signals from an external device (e.g., a smart phone) and processes the received signals to yield a baseband digital communication signal that is provided to the main controller 26, where the digital communication signal is processed to obtain the configuration commands and data carried thereby. The communication channel may be two-way, in which case the wireless data radio 38 sends wireless communication signals to the external device to convey a baseband digital communication signal from the main controller 26 that carries status, identification, and other useful information to the external device.

Figure 2:
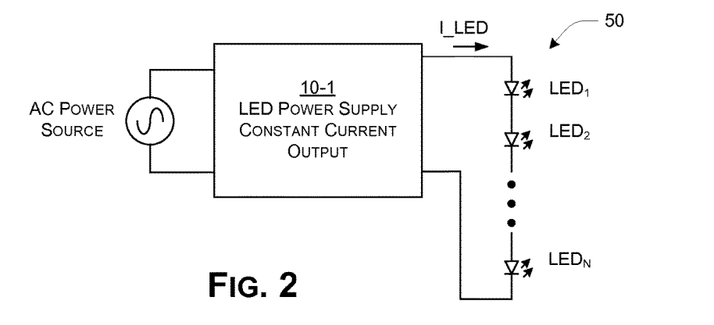
FIGS. 2 and 3 are block diagrams of lighting systems including LED power supplies.
Figures 3, 4, 5:
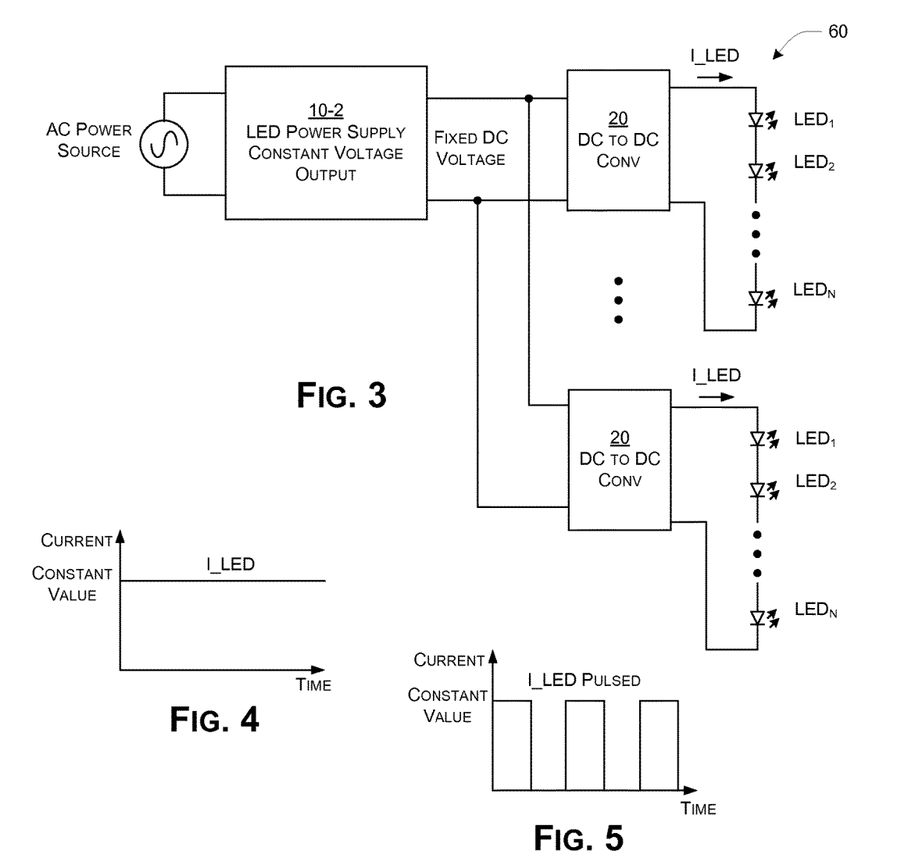
FIGS. 4 and 5 are plots of power supply output current.

FIGS. 2 and 3 are block diagrams of lighting systems that employ the power supply 10. In FIG. 2, a power supply 10-1 is configured for constant current output in driving a lamp 50 having a series of LEDs $LED_1, LED_2, \ldots, LED_N$. In FIG. 3, a power supply 10-2 is configured for constant current output in driving multiple parallel-arranged lamps 60 each having a series of LEDs $LED_1, LED_2, \ldots, LED_N$.

FIGS. 4 and 5 are plots illustrating two different ways in which constant-current output current can be provided. FIG. 4 shows a steady DC value of constant output current, while FIG. 5 shows constant-amplitude pulsed output current.

Figure 6:
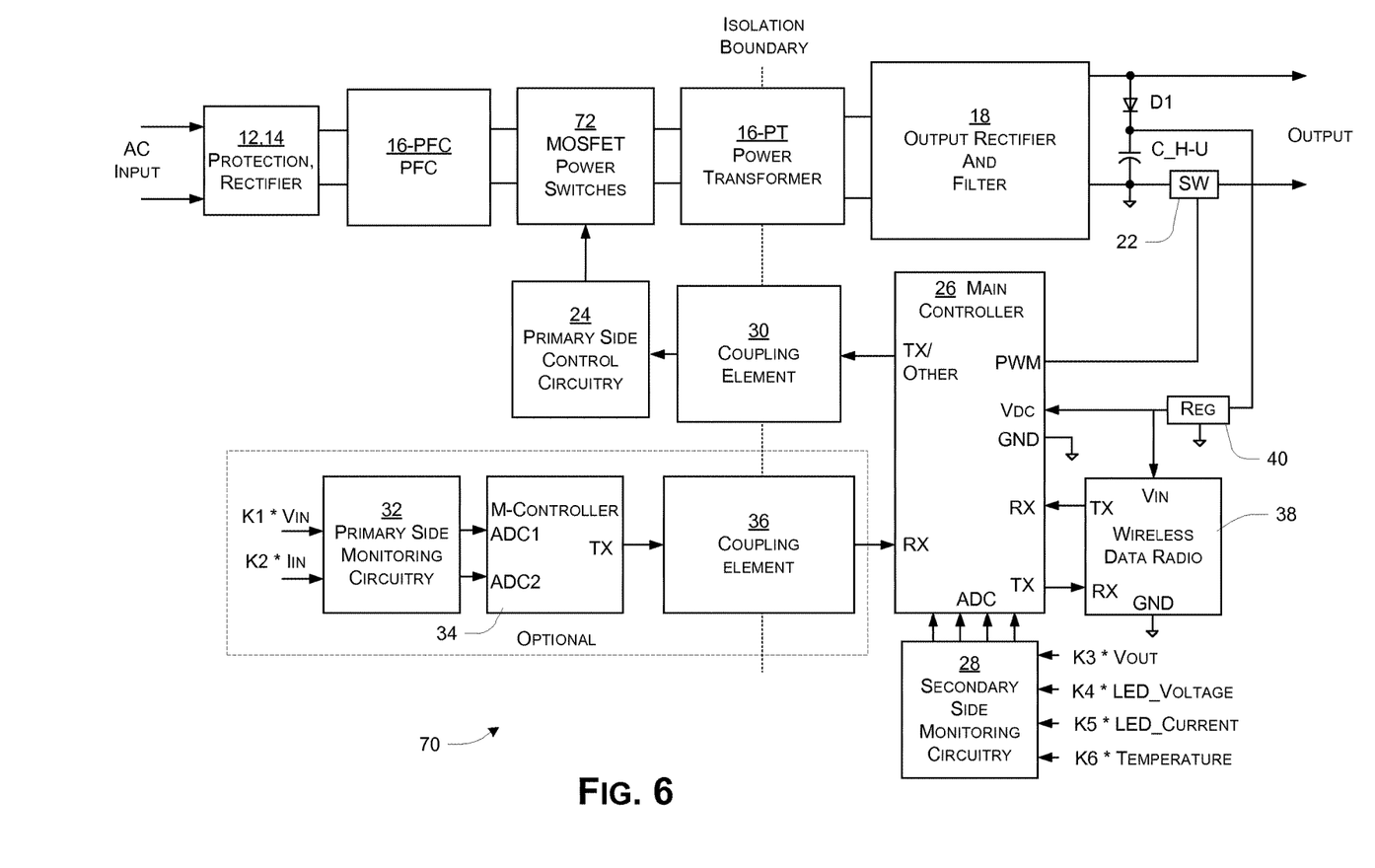
FIG. 6 is a schematic diagram of an LED power supply.

FIG. 6 is a schematic of an LED power supply 70 generally similar to the power supply 10 of FIG. 1. It differs in having the power switches 72 on the primary side, between the PFC circuitry 16-PFC and the power transformer 16-PT, whereas in the power supply 10 these switches are within the secondary-side DC to DC converter 20. Primary control by the main controller 26 is thus provided via the coupling element 30 and primary-side control circuitry 24.

Figure 7:
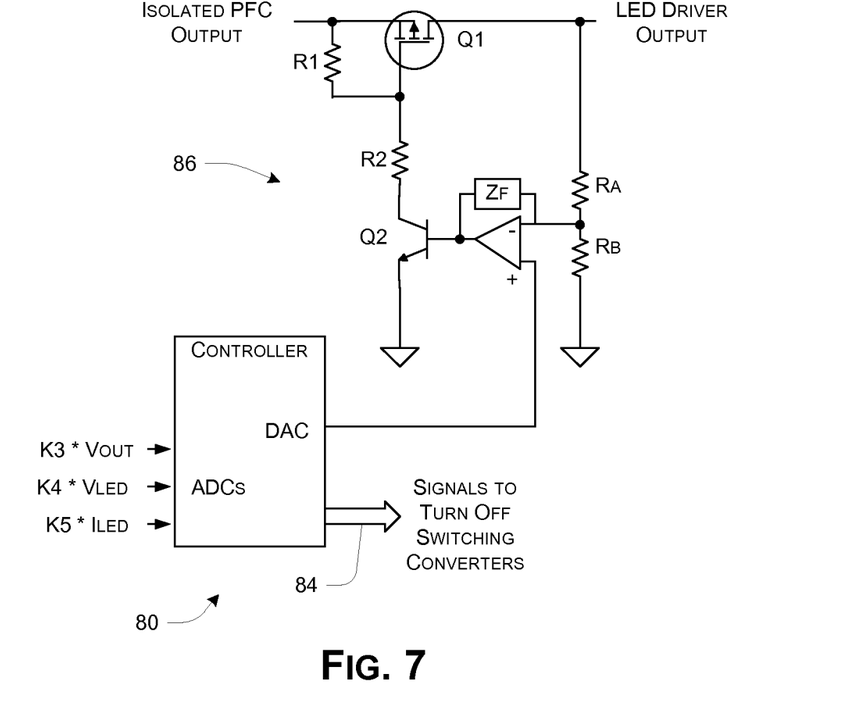
FIG. 7 is a schematic diagram of a linear regulator.

FIG. 7 is a schematic diagram of a linear regulator 80 that may be utilized to provide power in a ride-through manner when the power supply 10, 70 is not in a normal operating mode. A controller 82 generates control signals 84 to turn off the main switches (e.g., switches 72 or switches within DC to DC converter 20) and applies an operating value of a reference voltage used by analog regulation circuitry 86 to generate LED driver output power from the (pre-regulation) isolated PFC output.

Figure 8:
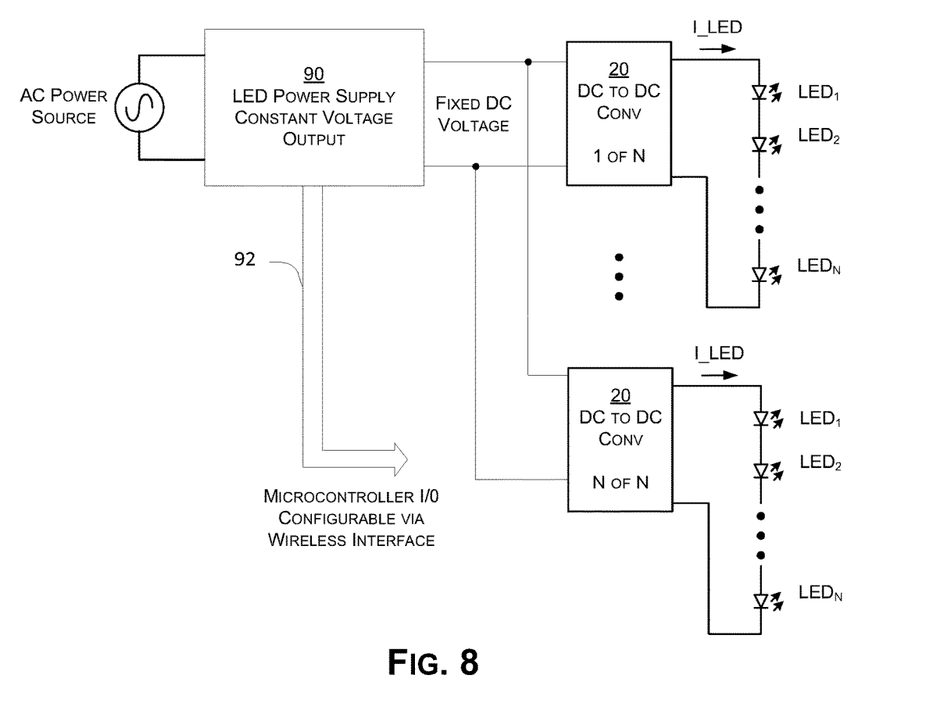
FIG. 8 is a block diagram of a lighting system including an LED power supplies.

FIG. 8 is a block diagram of a lighting system using a power supply 90 that is generally similar to the constant-voltage supply 10-2 (FIG. 3) but relying on external wireless communication circuitry rather than incorporating it. This configuration may provide greater flexibility for a manufacturer to produce and maintain lines of products that support different types of wireless interfaces and/or wireless interfaces that evolve over time. Such product lines can be customized or upgraded while still using the same underlying configurable power supply 90. In this example, the power supply 90 provides an I/O interface 92 to the separate wireless interface circuitry, not shown. The I/O interface 92 may preferably be provided by corresponding I/O connections of a main controller 26 within the power supply 90. Examples include digital PWM connections, digital I/O connections, and DAC channels.

Figure 9:
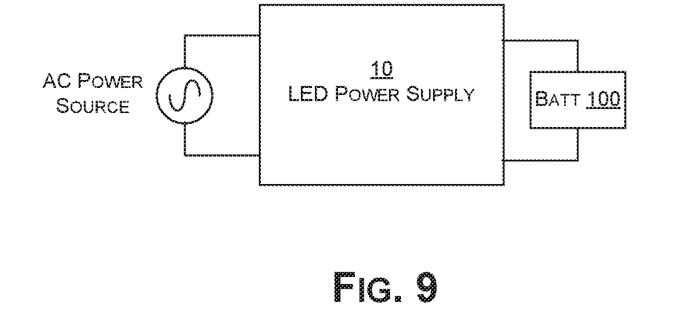
FIG. 9 is a plot of power supply outputs in a battery charging application.
Figure 10:
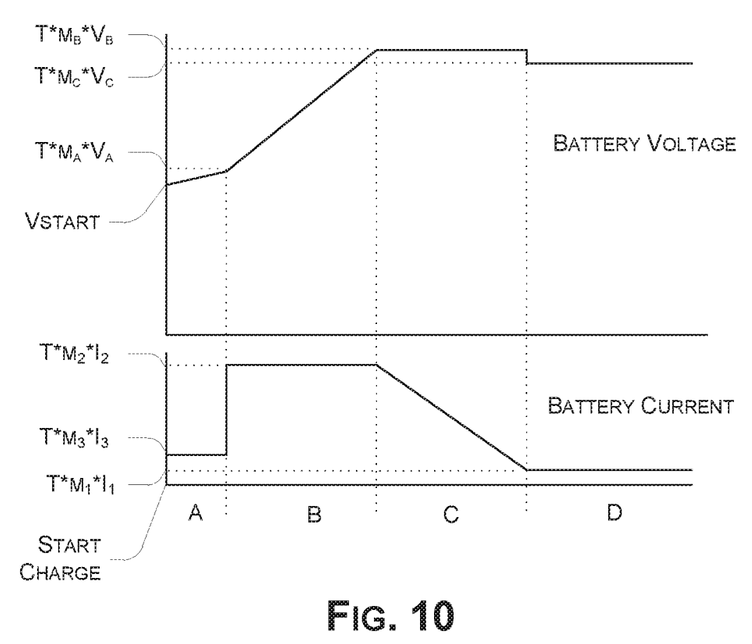

FIG. 9 illustrates a battery charging application such as described in U.S. Pat. No. 9,124,101. There are four sequential modes of operating, shown as A, B, C and D. Charging requirements of the load, specific to battery chemistry and capacity, have been communicated to the power supply 10 via the wireless communications, and the power supply 10 has incorporated operating parameters for the various charging modes accordingly. In this example, mode A provides a first constant current value until the output voltage reaches a defined voltage level. In mode B a different constant current value is provided until the output reaches a second defined voltage level. Mode C is a constant-voltage mode providing a constant voltage level until the output current tapers to a defined value, and mode D is a final constant voltage level. The charge parameters may be communicated to include some or all of these modes, and it is also is possible that in Mode D the power switch (Q1) is shut off to remove charging voltage. With configuration by way of communication, the power supply 10 can accommodate charging curves for potentially a large number of distinct battery chemistries.

While various embodiments of the invention have been particularly shown and described, it will be understood by those skilled in the art that various changes in form and details may be made therein without departing from the spirit and scope of the invention as defined by the appended claims.

What is claimed is:

1. A power supply, comprising:
   power circuitry configured and operative to provide DC power to a separate load;
   wireless communication circuitry operative to wirelessly communicate with an external control device; and
   a controller configured and operative to (1) conduct communications with the external control device via the wireless communication circuitry to receive configuration parameters, and (2) incorporate the configuration parameters into a control scheme for operation of the power supply,
   wherein the power supply is one of a plurality of distinct types capable of being configured by an external control device, each distinct type requiring a corresponding distinct set of configuration parameters, and the power supply has an external bar code readable by the external control device to obtain a product identifier, the product identifier being usable to obtain the distinct set of configuration parameters for the power supply for communication to the power supply via the wireless communication circuitry.

2. The power supply of claim 1, wherein the load is one of a plurality of types of load for which corresponding distinct operating modes of the power supply are required, and wherein the configuration parameters reflect selection among the distinct operating modes of the power supply based on the type of the load.

3. The power supply of claim 2, wherein the distinct operating modes include a constant-voltage mode and a constant-current mode, the constant-voltage mode maintaining a predetermined constant value of the output voltage over a range of values of the output current, the constant-current mode maintaining a predetermined constant value of the output current over a range of values of the output voltage.

4. The power supply of claim 1, wherein the power circuitry includes primary-side power switching circuitry operable at a variable duty cycle according to a control signal received from the controller via a DC-isolating device, variation of the duty cycle causing corresponding variation of the output voltage and/or output current of the power supply, and wherein the controller is a secondary-side controller having the output voltage DC-coupled thereto as a sensing voltage and performs constant-voltage operation in which the controller generates the control signal in a manner maintaining a constant value of the output voltage as represented by the sensing voltage, and wherein the configuration parameters received via the wireless communications establish the constant value of the output voltage maintained by the controller.

5. The power supply of claim 1, wherein the power circuitry includes primary-side power switching circuitry operable at a variable duty cycle according to a control signal received from the controller via a DC-isolating device, variation of the duty cycle causing corresponding variation of the output voltage and/or output current of the power supply, and wherein the controller is a secondary-side controller having a current-sense signal DC-coupled thereto, the current-sense signal developed directly from output current of the power supply, the controller performing constant-current operation in which the controller generates the control signal in a manner maintaining a constant value of the output current as represented by the current-sense signal, and wherein the configuration parameters received via the wireless communications establish the constant value of the output current maintained by the controller.

6. The power supply of claim 1, wherein the load is an LED lamp including a series of LEDs, and wherein the configuration parameters include parameters for a dimming curve applied in dimming operation of the LED lamp.

7. The power supply of claim 1, wherein the power supply has a constant-current mode and a constant-voltage mode, the constant-current mode providing a constant value of the output current over a range of values of the output voltage, the constant-voltage mode providing a constant value of the output voltage over a range of values of the output current, and wherein the load includes a rechargeable battery requiring the constant-current mode of operation of the power supply.

8. The power supply of claim 1, wherein the load is a battery whose charging requirements are communicated to the power supply via the wireless communications, and the power supply incorporates operating parameters for the charging requirements to establish multiple modes of operation, a first mode A providing a first constant current value until the output voltage reaches a defined voltage level; a second mode B providing a different constant current value until the output reaches a second defined voltage level; a third mode C being a constant-voltage mode providing a constant voltage level until the output current tapers to a defined value; and a fourth mode D providing a final constant voltage level.

9. The power supply of claim 1, wherein the configuration parameters include first values treated as temporary and stored in volatile memory of the controller, and second values for a semi-permanent or permanent operating mode and stored in nonvolatile memory of the controller.

10. The power supply of claim 1, wherein the controller and wireless communication circuitry are configured for transmitting operating data including output voltage, load current and operating temperature.

11. The power supply of claim 1, wherein the power supply also includes a wired communication interface using a serial communication protocol for communicating with the load, the wired communication interface including a protection switch in series with a power supply output that can be turned off to disconnect the power circuitry from the load, the wired communication interface (1) employing pulsed signaling at the power supply output to transmit information to the load, and (2) interpreting pulses received from the load to set operating conditions that are stored in memory prior to beginning normal operation with the protection switch closed.

12. The power supply of claim 1, including an energy-storing device in which energy is stored during first periods of normal operation of the power circuitry, the energy-storing device providing stored energy to the controller and the wireless communication circuitry during second periods of non-operation of the power circuitry, the second periods being used for wirelessly communicating with the external control device in the absence of electrical noise from the power circuitry.

13. The power supply of claim 1, wherein the power supply is configured and operative to establish initial operation in a predetermined mode using default configuration parameters, and includes an internal energy storage element charged during the initial operation to supply power to the wireless communication circuitry to enable the power supply to obtain configuration data for subsequent regular operation in a regular operating mode.

14. The power supply of claim 1, wherein the bar code includes data identifying a type of the wireless communication circuitry as well as specific communication parameters used to establish communication with the power supply.

15. The power supply of claim 1, wherein the load includes a second external bar code readable by the external control device to obtain information about the load, the information being usable to obtain other configuration parameters communicated to the power supply via the wireless communication circuitry.

16. The power supply of claim 15, wherein the load is an LED lamp and the information about the load includes data identifying a type of LED devices in the LED lamp.

17. The power supply of claim 16, wherein the information about the load includes data identifying a set diming curves used to dim the LED lamp, the data being used to set specific current levels, duty cycles and/or clocking frequencies of the power supply to realize the dimming curves.

18. The power supply of claim 1, wherein the configuration parameters establish bounds of operation relative to load requirements.

19. The power supply of claim 18, wherein the configuration parameters include output voltage set point and a switching frequency used for pulse-width modulation dimming.

20. A method of configuring the power supply of claim 1 using the external control device, comprising:
by the external control device, maintaining the distinct sets of configuration parameters for use in configuring the distinct types of power supplies;
by the external control device, reading the bar code and interpreting the bar code to select, from among the distinct sets of configuration parameters, the distinct set of configuration parameters appropriate for the power supply based on an association of the selected distinct set of configuration parameters with the bar code; and
by the external control device, conducting the communications with the power supply via the wireless communication circuitry to send the selected distinct set of configuration parameters to the controller of the power supply for configuring the power supply.

21. The method of claim 20, wherein the distinct types of power supplies have respective distinct types of wireless interfaces and corresponding distinct wireless communication parameters included in the corresponding distinct sets of configuration parameters, and further including, by the external control device, using the wireless communication parameters included in the selected distinct sets of configuration parameters to perform wireless communications with the power supply.

22. The method of claim 21, wherein the wireless communication parameters include address, timing and/or hold up time information.

* * * * *